Patented Aug. 2, 1949

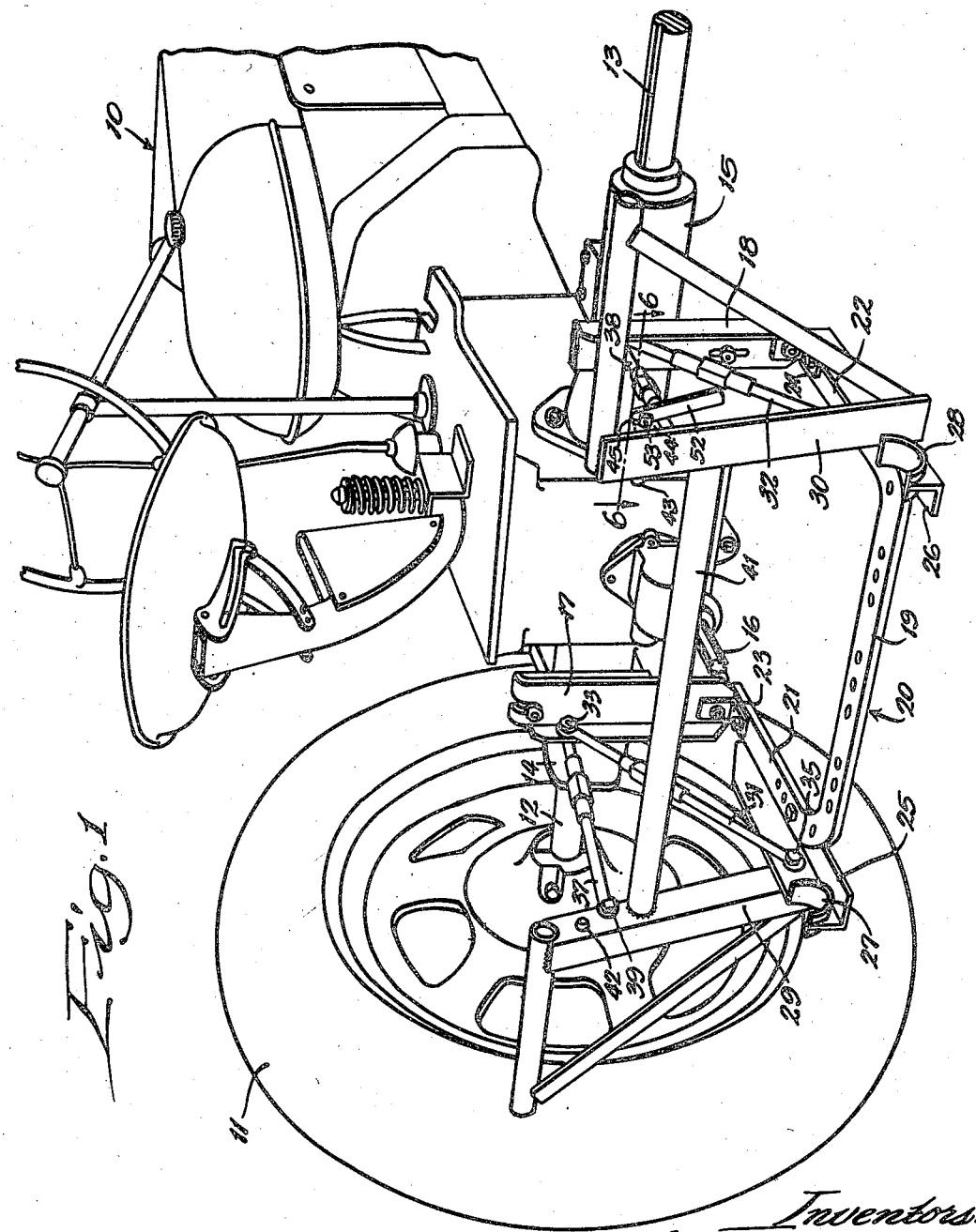

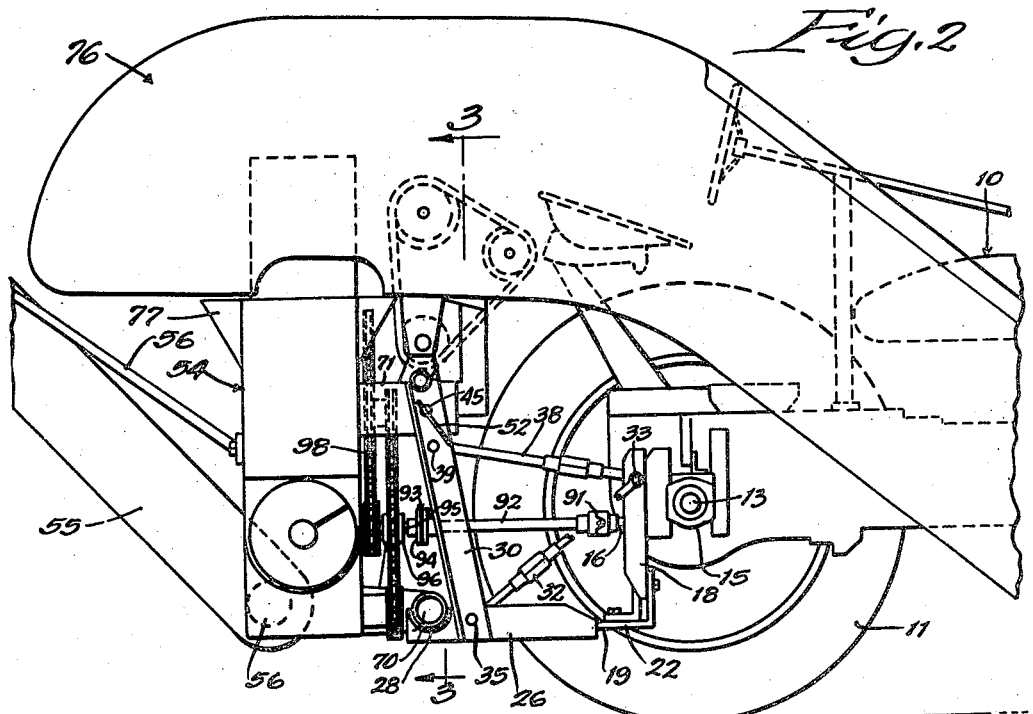
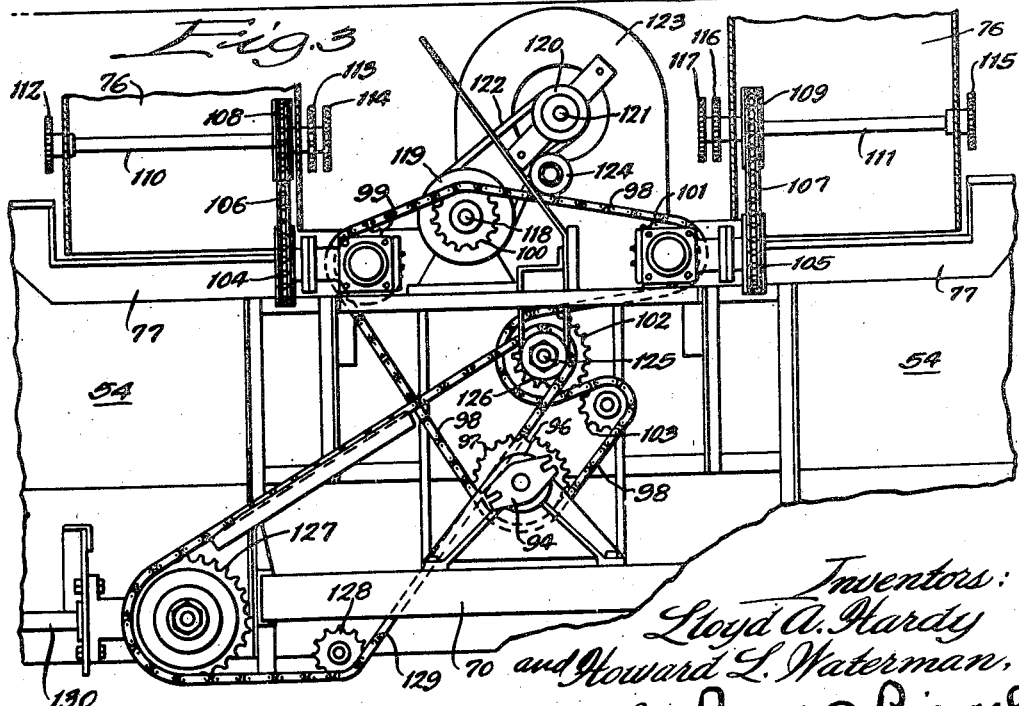

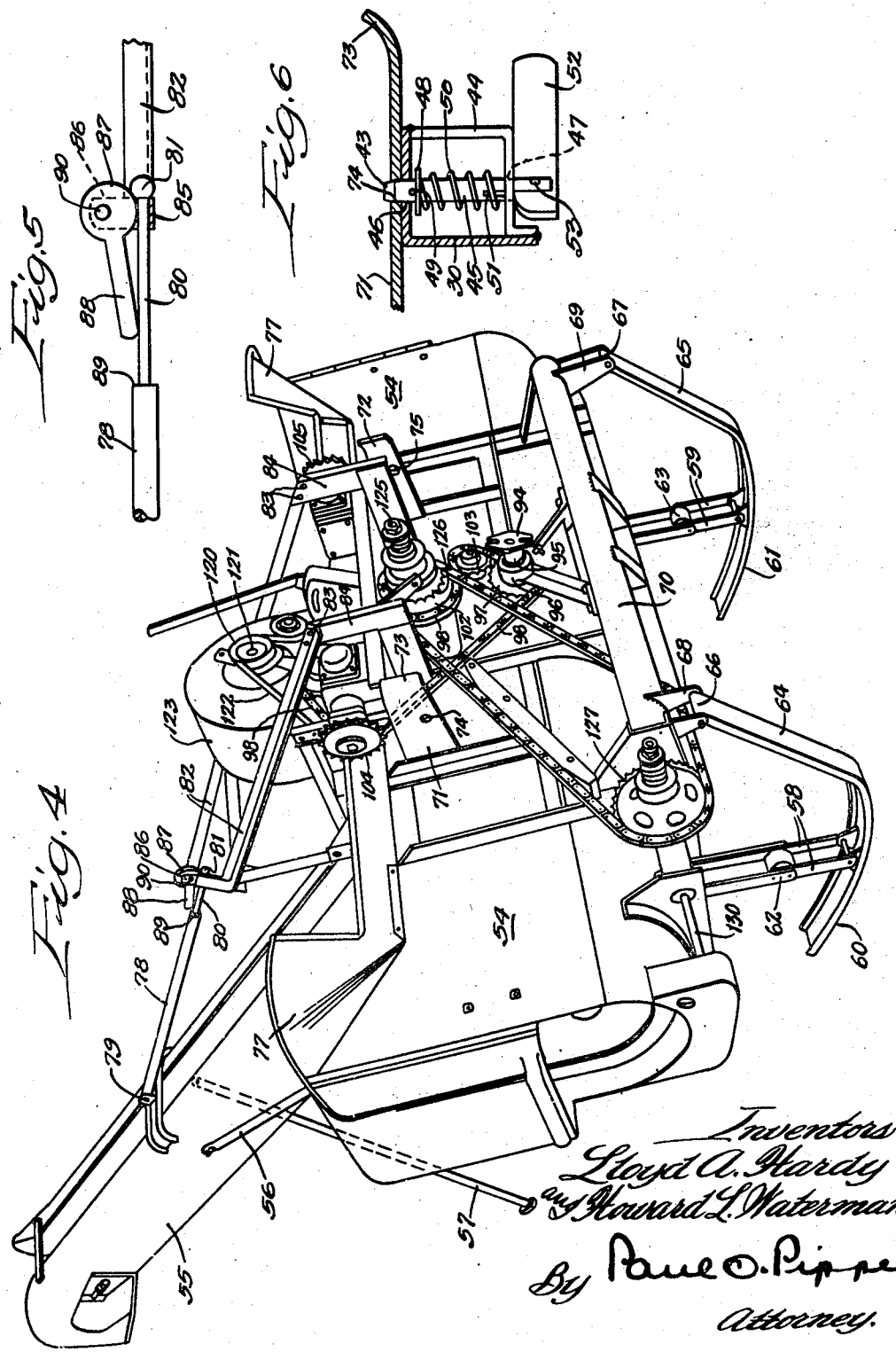

2,477,980

UNITED STATES PATENT OFFICE 2,477,980

MEANS FOR DETACHABLY MOUNTING CROP TREATING ATTACHMENTS TO TRACTORS

Lloyd A. Hardy, Cambridge, and Howard L. Waterman, Moline, Ill., assignors to International Harvester Company, a corporation of New Jersey Application May 25, 1945, Serial No. 595,787

7 Claims. (Cl. 130—27)

1

This invention relates to a tractor-mounted crop treating unit and has for one of its principal objects a provision of means for quickly attaching the crop treating unit to a farm tractor.

An important object of this invention is to provide a crop treating unit having shoes or jacks around which the unit may be rocked to facilitate attachment of the unit to a tractor having opposed complementary receiving sockets and locking means.

Another important object of this invention is to provide a corn husking and elevating device for ready attachment to the rear of a tractor having corn picking units mounted on the front thereof.

A further important object of the invention is to provide a corn husking and elevating unit adapted to be attached and detached from a tractor and having means on the husking and elevating unit to support the unit in upright position when the unit is separated from the tractor.

Another and still further important object of this invention is to provide a corn husking unit including a limited swinging wagon elevator and means for locking the elevator rigidly with the husking unit, whereby a movement of the wagon elevator will produce corresponding movement of the husking unit about leg or jack members.

Another and still further important object of this invention is to provide a corn husking unit adapted to be quickly attached to the rear of a tractor and to receive power from the tractor for operation of the husk removing means and adapted to have driving elements for association with corn picking units mounted on the front of the tractor for driving the elements of the picking units.

Other and further important objects of this invention will become apparent from the disclosures in the following specification and accompanying drawings in which:

Figure 1 is a perspective view of the tractor to which the crop treating unit in the form of a corn husking unit and elevator is to be attached;

Figure 2 is a side elevation of the tractor-mounted corn husking means of this invention;

Figure 3 is a sectional view taken on the line 3—3 of Figure 2;

Figure 4 is a perspective view of the corn husking and elevator unit removed from the tractor;

Figure 5 is a detail of the lock means provided between the wagon elevator and the husking unit; and Figure 6 is a sectional view taken on the line 6—6 of Figure 1.

2

As shown in the drawings:

The reference numeral 10 indicates generally a tractor having a narrow longitudinal body portion with relatively wide spread rear traction wheels 11 mounted at the outer ends of drive axles 12 and 13 which are generally supported within axle housings 14 and 15. Another important element of the tractor is the power take-off shaft 16 positioned centrally of the rear traction wheels 11 and projecting rearwardly from the tractor body. This power take-off shaft 16 is rotated by tractor power and is equipped with splines around the periphery thereof for ready driving attachment with implements to be attached to the tractor.

For purposes of receiving corn husking means the tractor is equipped with receiving sockets and locking elements. Vertical angle bars 17 and 18 are secured respectively to the axle housings 14 and 15. Each of these angle bars 17 and 18 has one face abutting the axle housing. The other face of the angle bars 17 and 18 extends rearwardly. A U-shaped draw-bar 19 has a transverse rear portion 20 and forwardly extending legs 21 and 22 which are attached to the lower ends of the angle bars 17 and 18, respectively, at 23 and 24. Supporting members 25 and 26 are rigidly secured to the draw-bar legs 21 and 22 respectively and extend rearwardly beyond the transverse portion 20 of the draw-bar 19. These supporting members 25 and 26 have transversely alined upwardly open spaced apart sockets 27 and 28 at their rear ends. Vertical posts 29 and 30 extend upwardly from the supporting members 25 and 26 respectively. In order to reinforce the rearward end of the draw-bar and also the supporting members 25 and 26, inclined bracing rods 31 and 32 are extended between the rearwardly extending faces of the angle bars 17 and 18 from their attaching points 33, downwardly and rearwardly to the supporting members 25 and 26 at their attaching points 35. Another set of bracing or tie rods 37 and 38 are provided between the upper portions of the vertical supports 29 and 30 at 39, forwardly to the angle bars 17 and 18 on the other side of the rearwardly extending faces at the same level as the connection 33. A spacing pipe 41 is positioned transversely between the vertical supports 29 and 30 and is rigidly attached at its ends to each of these vertical supports.

Spring-pressed tapered end locking pins 42 and 43, as best shown in Fig. 6, are positioned in the vertical supports 29 and 30 and are adapted to engage apertures in a corn husking unit to be mounted on the tractor. At the point where the pin 43 projects through the side face of the upright support 30, the angle bar is entirely enclosed by the member 44. This enclosure member 44 is welded or otherwise attached to the vertical angle support 30 and provides support for the remaining portion 45 of the locking pin 43. The locking pin 43 is guided within the aperture 46 in the vertical angle bar support 30 and in the aperture 47 in the enclosure member 44. These apertures 46 and 47 are alined so that the pin 43 may slide in a horizontal plane. The portion of the pin 45 within the enclosure, as shown in Figure 6, is equipped with a collar 48 held in position by a pin 49. A spring 50 is coiled around the lock pin 43 between the collar 48 and the enclosure member 44. The spring acts to normally impel the collar, and by means of the cross pin 49 the locking pin 43 is forced outwardly or as viewed in Figure 1 is forced inwardly. A slot 51 is provided in the end of the portion 45 of the locking pin 43. An operating or cam arm 52 is pivoted at 53 in the slot 51 of the locking pin outside of the enclosure 44. The pivot 53 between the cam arm 52 and the portion 45 of the locking pin is arranged so that the distance to the side of the cam arm 52 is less than the distance to the end of the cam arm 52. By this arrangement of parts and selection of distances, it will be seen that as the cam arm 52 is swung outwardly into a straight line relationship with the locking pin 43, the locking pin will be withdrawn to a position in which it does not project beyond the aperture 46 in the vertical angle bar 30. Swinging of the cam arm 52 causes a compression of the spring 50.

The corn husking and elevator unit is best shown in Figure 4. The unit is provided with a substantial rectangular box portion 54 which houses the usual husk removing rolls, grain saving devices and husk discharge means. An upwardly and rearwardly extending lever or crop elevating structure 55 is mounted for relative movement about a pivotal connection with the box 54 at 56, as shown in Figure 2. Brace members 56 and 57 are provided between the elevator 55 and the husking chamber 54. Legs or jacks 58 and 59 are provided beneath the husking box 54 at the forward end thereof, and as shown in Figure 4, these forwardly positioned legs are provided with arcuate shoes or curved runners 60 and 61. The legs are adapted to be extended in the position shown and constitute the means on the crop treating or corn husking means for removing the corn husking means from the tractor and also constitute the means for mounting the unit on the tractor. Means are provided at joints 62 and 63 so that the legs or jacks 58 and 59 may be collapsed and held in a position upwardly just beneath the corn husking box portion 54. As shown, the legs 58 and 59 are reinforced by upwardly curved extensions 64 and 65 of the shoes 60 and 61 respectively. The upwardly curved extensions are pivoted at 66 and 67 on brackets 68 and 69 depending from a cross pipe 70 which forms the forward portion of the husking unit 54. It should be understood that any type of extending leg may be employed to replace the legs 58 or 59 as shown in the drawing, and although it is desirable it is not essential that the shoes be curved to form a portion about which the machine may be rocked.

The transverse pipe 70 is adapted to be received by the open sockets 27 and 28 on the tractor 10. When the crop treating unit is removed from the tractor in the position as shown in Figure 4, the tractor 10 is backed into position so that the sockets 27 and 28 are directly beneath the pipe 70. An upward force is then applied to the elevator 55, and by means of the lock as shown in Figure 5, this upward movement is imparted to the husking unit so that the husking unit first rocks about the curved leg shoes and when the pipe 70 nests in the sockets 27 and 28 the husking unit then pivots about the pipe 70 as an axis and the upper portion of the husking unit box 54 is swung inwardly toward the tractor.

The husking unit box 54 is provided with a pair of forwardly extending arms 71 and 72. These arms are curved inwardly at their forward ends as best shown at 73 in Figure 6. Holes 74 and 75 are provided in the flat portion of the arms 71 and 72 to receive the locking pins 42 and 43. The inwardly curved portions 73 of these forwardly projecting arms 71 and 72 are for the purpose of overcoming any slight misalinement of the tractor with the corn husking unit. The arms 71 and 72 are adapted to slide between the vertical supports or posts 30 and 29. The locking pins 42 and 43 are tapered at their outer ends, and when the pins strike the arms 71 and 72 and particularly the curved-in portions 73, the pins 42 and 43 are pushed outwardly into the enclosure defined by the angle bar 30 and the enclosure member 44. As soon as the holes 74 and 75 come into alinement with the locking pins 42 and 43, the pins are permitted to spring inwardly and engage the arms 71 and 72. The actual locking of the husking unit in place by the locking pins 42 and 43 is best shown in Figure 6 in which the pin 43 is shown projecting through the aperture 74 in the arm 71. In order to remove the husking unit from the tractor, it is then necessary to swing the cam arms 52 outwardly about their pivots 53 so that the locking pins 42 and 43 will be retracted to a position whereby no contact is made between the locking pins and the forwardly projecting arms 71 and 72 of the corn husking unit.

The tractor is equipped with means for receiving corn picking units on the forward end thereof and this is shown in a copending United States application having Serial No. 595,788, filed May 25, 1945. As shown in Figure 2 of the drawings, corn picking and snapping units 76 are adapted to pick the corn from rows and snap the ears from the stalks and carry the ears rearwardly to a point above the husking unit 54. The upper portion of the husking unit box 54 is flared outwardly as at 77 to form a hopper for ready reception of the ears of corn as they drop from the corn picking and snapping unit 76. The corn picking and snapping units perform a complete operation separate from the corn husking and elevating unit which is attached at the rear end, and for that reason the complete invention has been divided and two applications to cover same are therefore being filed. The corn husking and elevating unit may be operated by merely dumping ears of corn with the husks still on into the hoppers 77 of the husking unit 54, whereupon the ears will be husked and the corn elevated in the elevator 55 to a point up and over a trailing wagon whereupon the ears are allowed to fall into the wagon.

As previously stated, the elevator 55 is adapted to have some limited movement with respect to the corn husking unit 54. This free movement is permitted by telescopic members which consist of the sleeve 78 which is pivoted at its top to the elevator 55 at 79 and a telescoping rod 80 pivoted around the ball ending 81 within a structural member 82 fixed at 83 to an upwardly extending bracket 84 which forms part of the husk removing box 54. Normally the elevator 55 may be swung upwardly and the only reaction is the further insertion of the rod 80 within the sleeve 78. If no locking means were provided between the elevator and the husking unit, an upward swinging of the elevator would not lift the husking unit and hence it would be impossible to mount the husking unit and elevator onto the tractor merely by an upward swinging of the elevator. An elevator must have free movement to prevent distortion thereof when the trailing wagon is running over uneven ground. However, in order to overcome this freedom of movement between the elevator and husking unit, a lock means, best shown in Figure 5, is provided between the telescoping elements 78 and 80. The lock consists of a U-shaped supporting bracket 85 which is fixed to the end of the rod 80. The U-shaped bracket 85 has upwardly extending arms 86 between which is mounted an eccentric roller 87 having a rearwardly projecting arm 88. As shown in Figure 5, the arm 88 will limit telescoping of the rod 80 within the sleeve 78 by contact of the end of the arm 88 engaging an abutment on the sleeve 78 which as disclosed is the end 89 of the sleeve 78. The arm 88 will not be apt to move upwardly upon an application of force to the now rigid lever or elevator 55 because of the eccentric pivoting 90 of the roller 87. In other words, the eccentric pivot 90 lies above the longitudinal axis (not shown) of the arm 88. This locking position is only maintained during mounting of the implement or crop treating unit onto the tractor. It will be understood that when the husking unit is entirely mounted on the tractor, the arm 88 will be swung upwardly around the eccentric pivot 90 so that the arm 88 lies in a forward position to be free of the telescoping engagement between the sleeve 78 and rod 80. Another necessary operation after the machine is mounted on the tractor is to replace the brace member 57 which has been swung rearwardly to support the elevator 55 and act as a rear stabilizing leg when the unit is dismounted from the tractor. Still another necessary duty is to collapse the legs 58 and 59 so that they are up out of the way when the machine is run through the corn fields.

As best shown in Figures 2 and 3, the tractor power take-off 16 is joined by a coupling 91 which carries the drive rearwardly through a shaft 92 to another coupling 93. The forward portion of this coupling 93 is part of the tractor equipment, whereas the rear portion of the coupling 94 as best shown in Figure 4 is fixedly mounted for rotation on the husking box 54. This part 94 of the coupling is mounted on a shaft 95 journaled in a bearing 96, the other side of which carries a sprocket 97. The drive for the husking unit, the wagon elevator and the corn picking units is obtained or taken from this sprocket 97. The chain 98 is trained over the sprocket 97 and, as best shown in Figure 3, extends upwardly and around a plurality of sprockets 99, 100, 101, 102, and 103. The sprockets 99 and 101 are adapted to transmit their rotary motion at right angles to sprockets 104 and 105, which in turn by means of chains 106 and 107 are adapted to drive sprockets 108 and 109 which are keyed to jack-shafts 110 and 111. Each of these jack-shafts 110 and 111 carries sprockets 112, 113, 114, 115, 116, and 117. These sprockets are available for driving elements of the corn picking units 76 which are mounted forwardly on the tractor 10.

The sprocket 100 is mounted on a shaft 118 which also carries a pulley 119. Another pulley 120 is mounted on a shaft 121 and is driven by means of a V-belt 122 extending between the pulleys 119 and 120. A fan (not shown) is mounted on the shaft 121 within the housing 123 and is adapted to function as a part of the husking unit. An adjustable idler pulley 124 is provided merely for obtaining the proper tension in the V-belt 122.

The sprocket 102 is keyed or otherwise fastened to a shaft 125 which in turn has fastened thereto another sprocket 126 in the same plane with sprockets 127 and 128. A chain 129 is trained about the sprockets 126, 127 and 128. The rotary motion obtained in the sprocket 127 is transmitted at right angles thereto through a shaft 130. All of these driven sprockets and shafts drive portions of the husking unit and ear elevator, and the power for each of these drive elements is taken directly from the single power take-off shaft 16 on the tractor 10. Inasmuch as the function of the husking unit forms no part of the present invention, its working interior is not shown.

It is evident that herein is provided a quick-attachable grain treating unit for mounting and dismounting on a tractor. The legs or jacks 58 and 59 are located substantially at the center of gravity of the husking unit so that an operator merely by lifting up on the elevator 55 may easily cause the pipe 70 to engage the sockets 27 and 28 and from there on lift the husking unit in an arcuate movement about the pipe 70 so that the forwardly projecting arms 72 and 73 slide between the vertical supports 29 and 30 and the automatic locking means, as shown in Figure 6, is caused to be actuated.

Numerous details of construction may be varied throughout a wide range without departing from the principles disclosed herein, and we therefore do not propose limiting the patent granted hereon otherwise than as necessitated by the appended claims.

What is claimed is:

1. In a tractor having structural elements for receiving and supporting a crop-treating device comprising a pair of transversely alined spaced apart upwardly open sockets positioned on said tractor, spaced apart posts on the tractor having transverse disposed spring-pressed locking pins urged inwardly and spaced from said upwardly open sockets, a transverse member rigidly fixed to said crop-treating device, a pair of forwardly extending arms on said crop-treating device and having alined apertures therein, and leg means about which the said crop-treating device may be pivoted for mounting of the device on said tractor, whereby the transverse member engages the upwardly open sockets and the spring pressed locking pins engage the apertures on the forwardly extending arms of the crop-treating device.

2. In a tractor having structural elements for receiving and supporting a crop-treating device, said structural elements having a pair of transversely alined spaced apart upwardly open sockets, spaced apart posts on the tractor, spring biased locking pins projected inwardly from said posts, a cross pipe rigidly fixed to said crop-treating device, a pair of forwardly extending arms having alined apertures therein, and means on said crop-treating device for effecting mounting of said crop-treating device on said tractor, said means including leg members for said crop-treating device about which the device may be rocked and a lever extending upwardly and rearwardly from said crop-treating device, whereby an upward movement of said lever when the crop-treating device is properly alined behind the tractor will cause the cross pipe to engage the sockets and the forwardly extending arms to slide between the locking pins for effecting engagement of the pins with the arm apertures.

3. In a tractor having means for receiving and supporting a corn husking and elevating device comprising a pair of spaced apart open sockets, spaced apart posts on the tractor, tapered locking pins spring pressed inwardly from said posts, a cross pipe rigidly fixed to said corn husking and elevating device and adapted to engage said sockets for pivotal engagement, and a pair of forwardly extending arms on said corn husking device, said arms having inwardly curved portions at their forward ends and having transversely extending holes in their rear straight portions, said holes positioned to receive the locking pins in the tractor-mounted position of the corn husking and elevating device, whereby rocking of said husking device cross pipe in said spaced apart open sockets will cause the forward curved portions of said arms to spread the spring pressed locking pins so that they may spring back inwardly when the holes in the arms become alined with the locking pins.

4. In a tractor having means for receiving and supporting a corn husking and elevating device comprising a pair of spaced apart open sockets, spaced apart posts on the tractor, tapered locking pins spring pressed inwardly from said posts, a cross pipe rigidly fixed to said corn husking and elevating device, said sockets adapted to receive said cross pipe for pivotal engagement, a pair of forwardly extending arms on said corn husking device, said arms having inwardly curved portions at their forward ends and having transverse holes in their rear straight portions, whereby rocking of said husking device cross pipe in said spaced apart open sockets will cause the forward curved portions of said arms to spread the spring pressed locking pins so they may spring back inwardly when the holes in the arms become alined with the locking pins, and manual means for retracting said locking pins including cammed arms hinged to said locking pins and arranged and constructed upon swinging movement to move the pins outwardly.

5. In a crop-treating device, a crop-elevating structure extending upwardly and outwardly from a pivotal connection with a lower portion of said crop-treating device, telescopic members joining said elevating structure intermediate its ends and said crop-treating device at a point above said pivotal connection and normally adapted to permit limited pivotal movement of said elevating structure with respect to said crop-treating device, and locking means for holding said telescopic members extended whereby said crop-elevating structure is held against pivoted movement with respect to the crop-treating device.

6. A device as set forth in claim 5 in which the telescopic members include a rod and a sleeve, said rod slidably engaging said sleeve, and the locking means comprises an arm having one end pivotally mounted on said rod spaced from the end of said rod, said arm in one position thereof adapted to abut the end of said sleeve and maintain the rod and sleeve spaced apart the length of the arm.

7. A device as set forth in claim 6 in which the arm pivot is spaced laterally outwardly of said rod whereby when the arm is swung to a position between the telescopic members the arm will be inclined at a greater angle for more securely holding the arm in locking position.

LLOYD A. HARDY.
HOWARD L. WATERMAN.

REFERENCES CITED

The following references are of record in the file of this patent:

UNITED STATES PATENTS

| Number | Name | Date |
|---|---|---|
| 899,142 | Stone | Sept. 22, 1908 |
| 2,184,084 | Rosenthal et al. | Dec. 19, 1939 |
| 2,259,892 | Hyman | Oct. 21, 1941 |
| 2,376,539 | Hitchcock et al. | May 22, 1945 |
| 2,376,541 | Johnson et al. | May 22, 1945 |
| 2,401,183 | Pool et al. | May 28, 1946 |